(12) United States Patent
Dubey et al.

(10) Patent No.: US 9,605,158 B2
(45) Date of Patent: Mar. 28, 2017

(54) POLYSTYRENE FOAM PRODUCTS WITH IMPROVED ADHESION AND WATER RESISTANCE, AND METHODS OF MAKING THE SAME

(71) Applicant: United States Gypsum Company, Chicago, IL (US)

(72) Inventors: Ashish Dubey, Grayslake, IL (US); Yanfei Peng, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 152 days.

(21) Appl. No.: 13/804,386

(22) Filed: Mar. 14, 2013

(65) Prior Publication Data
US 2014/0272381 A1   Sep. 18, 2014

(51) Int. Cl.
| | |
|---|---|
| C09D 5/00 | (2006.01) |
| C09D 5/02 | (2006.01) |
| C09D 7/12 | (2006.01) |
| C08K 3/00 | (2006.01) |
| C08K 5/09 | (2006.01) |

(52) U.S. Cl.
CPC ............. C09D 5/00 (2013.01); C09D 5/024 (2013.01); C09D 7/1216 (2013.01); C09D 7/1233 (2013.01); C08K 3/0033 (2013.01); C08K 5/09 (2013.01); *Y10T 428/249991* (2015.04)

(58) Field of Classification Search
CPC ....... C09D 5/00; C09D 107/04; C09D 109/08
USPC ....................................... 428/319.3
See application file for complete search history.

(56) References Cited

U.S. PATENT DOCUMENTS

| | | | | |
|---|---|---|---|---|
| 4,495,228 | A * | 1/1985 | Cornwell | 427/385.5 |
| 4,729,919 | A * | 3/1988 | Uroda | 428/215 |
| 2002/0157573 | A1* | 10/2002 | Pellett | 106/400 |
| 2008/0060299 | A1 | 3/2008 | Dubey et al. | |
| 2008/0066650 | A1* | 3/2008 | Dubey | 106/705 |
| 2009/0305019 | A1* | 12/2009 | Chanvillard | C04B 22/008 428/220 |
| 2012/0090812 | A1* | 4/2012 | King | E04F 13/0812 165/53 |

\* cited by examiner

*Primary Examiner* — Hai Vo
(74) *Attorney, Agent, or Firm* — Greer, Burns & Crain, Ltd.; Pradip Sahu; Philip T. Petti

(57) ABSTRACT

A water-resistant preformed polystyrene foam product with improved adhesive properties is provided. A water-resistant coating for preformed polystyrene products is also provided. The coating can be formulated as a sprayable composition and is easy to apply. Methods for making the coating formulations and water-resistant preformed polystyrene products are also provided.

10 Claims, 6 Drawing Sheets

POLYSTYRENE FOAM PRODUCTS WITH IMPROVED ADHESION AND WATER RESISTANCE, AND METHODS OF MAKING THE SAME

FIELD OF THE INVENTION

This invention provides expanded polystyrene foam components with improved adhesion for ceramic and natural stone tiles. The invention also relates to sprayable coating formulations for polystyrene foam products, as well as to methods for making the sprayable formulations and water-resistant polystyrene foam products. Coating compositions are provided that render polystyrene foam products, including shower components, water-resistant.

BACKGROUND

Products made from expanded polystyrene foam are highly valued. For example, preformed polystyrene foam components are favored in construction because they are lightweight and easy to install. Polystyrene can provide excellent thermal insulation and can be molded into a variety of shapes. Polystyrene foam would be a material of choice in making shower and bathroom components, especially when irregularly shaped items are needed, but for the fact that the material is not water-resistant. Further, ceramic tiles, natural stone tiles and other decorative materials commonly used in showers and bathrooms do not adhere well to polystyrene foam products.

Various attempts have been made to create a water resistant coating for expanded polystyrene products. For example, latex-based coatings have been used. But while such coatings improve water resistance of polystyrene foam to some degree, they are not water-resistant enough. Further, such latex-based coatings have inferior durability performance including poor scratch and UV resistance and do not necessarily improve the adhesive properties of polystyrene products, especially when tiles are selected for attachment to the products. Furthermore, the latex-based coatings tend to be significantly more costly than the water-resistant coatings of this invention. Finally, polystyrene is sensitive to certain hydrocarbon solvents, and many organic compounds are unsuitable for use on polystyrene as they may cross-react and damage the surface of a polystyrene product.

Thus, there remains a need in the field for preformed polystyrene products with improved water resistance and adhesion for tiles and other decorative materials. Because curved and generally irregular shapes of various shower components are laborious to paint, there also remains a need in the field for improved coating formulations that can be spray-coated on such shower components.

SUMMARY

Polystyrene foam products are commonly used in various applications, including shower and bathroom components. However, these products are permeable to water and decorative materials do not adhere well to the products. An improved polystyrene foam product is provided which has improved adhesion and is water-resistant.

In one embodiment, a preformed shower or bathroom component is provided that is made of an expanded polystyrene foam body which is covered with a coating made of Class C fly ash and a latex polymer. In another embodiment, a preformed shower or bathroom component is provided that is made of an expanded polystyrene foam body which is covered with a coating made of Class C fly ash, a latex polymer and a set control agent. The coatings render the shower component water-resistant and improve adhesion of ceramic tiles and other decorative materials to the shower component. In some embodiments, about 0.20 parts by weight of a set control agent is used for every 100 parts by weight of the Class C fly ash. The present water-resistant coating is very light in weight and about 10 grams to about 50 grams per one square foot of a polystyrene foam component are sufficient to render the polystyrene foam component water-resistant and improve its adhesion to ceramic tiles. At least in some embodiments, the coating weights from about 20 grams to about 45 grams per one square foot. The coating renders the polystyrene foam component water-resistant and improves adhesion of ceramic tiles. At least in some embodiments, a set control agent is selected from the group consisting of polycarboxylic acid, citric acid, and any suitable salt thereof.

At least in some embodiments, a shower compartment coated with the present coating remains impermeable when exposed to a 48" head of water continuously for at least 10 days. At least in some embodiments, the present coating improves adhesion of ceramic tiles to a preformed polystyrene foam shower component by at least 10% in comparison to a preformed polystyrene foam shower component which is not coated.

In a further embodiment, a sprayable water-resistant coating for a polystyrene foam product is provided. The coating is made of Class C fly ash, a latex polymer dispersed in water and a set control agent selected from the group consisting of polycarboxylic acid, citric acid, and any suitable salt thereof. At least in some embodiments, between 0.10 to 0.75 parts by weight of the set control agent is used for every 100 parts by weight of the Class C fly ash. A latex polymer can be dispersed in water and at least in some embodiments, the latex polymer is a dispersion of 25 to 75 weight percent suspended solids in water. Various latex polymers can be used in the present coatings, including, but not limited to methyl methacrylate polymer or a copolymer of methyl methacrylate and butyl acrylate.

At least in some embodiments, a superplasticizer is added to the coating. Suitable superplasticizers include compounds based on polycarboxylic ethers. At least in some embodiments, about 0.10 to 0.30 parts by weight of a superplasticizer is used for every 100 parts by weight of Class C fly ash.

Methods for making a water-resistant preformed polystyrene foam shower component are also provided. In some embodiments, the shower component is spray coated with the present coating such that from 20 to 45 grams of the coating are distributed over each square foot of the shower component.

In further embodiments, a method for making a sprayable water-resistant coating for a preformed polystyrene foam shower component is provided. In some embodiments for the method, Class C fly ash is passed through a mesh, and about 50 parts by weight of a 50% latex polymer suspension in water is added to about 100 parts by weight of Class C fly ash and about 0.20 parts by weight of a set control agent. The mixture is blended together in a mixer and is ready to be sprayed on a preformed polystyrene foam shower component.

In some embodiments, the viscosity of the coating material after mixing remains generally constant for about 30 minutes or more (e.g., about 40 minutes or more, about 50 minutes or more, about 60 minutes or more), such as about 30 minutes to about 60 minutes. In these embodiments, the coating material remains easily workable and sprayable during the period the material viscosity is practically unchanged.

In some embodiments, the temperature of the coating material after mixing remains generally constant for about 30 minutes or more (e.g., about 40 minutes or more, about 50 minutes or more, about 60 minutes or more), such as about 30 minutes to about 60 minutes. In these embodiments, the coating material remains easily workable and sprayable during the period the material temperature is practically unchanged.

In some embodiments, the coating sets and dries rapidly when applied as a thin layer to the polystyrene foam component. The amount of Class C fly ash present in the coating is desirable in this regard. This advantage can be achieved in accordance with embodiments of the invention both under ambient conditions and at elevated temperatures. For example, in some embodiments, the coating setting and drying time, under ambient condition of 75° F. temperature and 50% relative humidity, can be about 40 minutes or less (e.g., about 30 minutes or less, about 20 minutes or less, about 10 minutes or less), such as about 10 minutes to about 40 minutes. In some embodiments, the coating sets very rapidly at elevated temperatures. For example, in some embodiments, the final setting and drying time of the coating at elevated temperatures (about 175° F. to about 225° F.) can be about 3 minutes or less (e.g., about 2 minutes or less, about 1 minute or less, or about 30 seconds or less), such as about 30 seconds to about 3 minutes.

DETAILED DESCRIPTION

A typical formed polystyrene product, such as, but not limited to a bathroom shower insert or similar product made from expanded polystyrene foam is lightweight, easy to mold into a variety of shapes, installs in a short period of time and provides excellent thermal insulation. However, expanded polystyrene is not resistant to water. Further, ceramic tiles and other decorative materials conventionally used in bathroom decoration do not adhere well to polystyrene products. Such decorative tiles dislodge easily from polystyrene, especially when the product is exposed to water, which is often the case in shower rooms and bathrooms.

Figure 1:
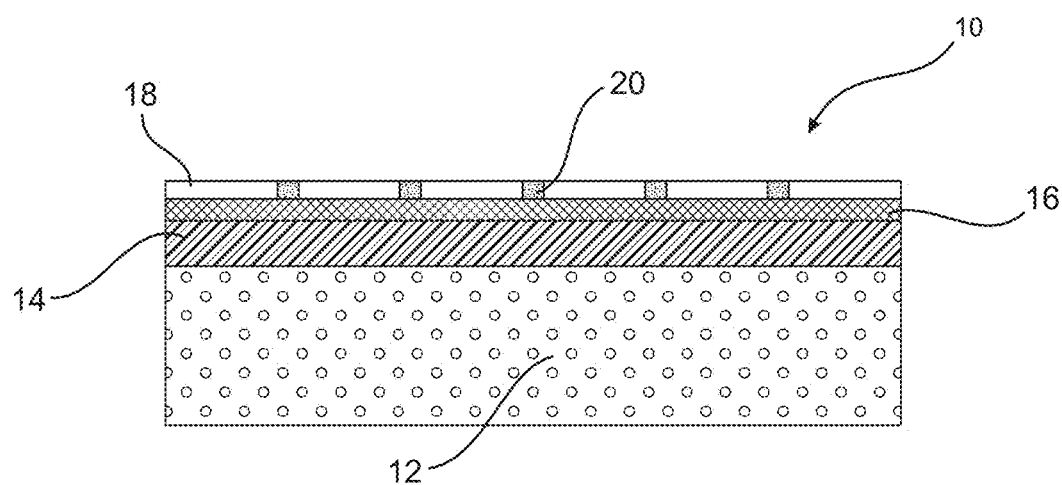
FIG. 1 is a fragmentary cross-section of the present water-resistant polystyrene foam component with improved adhesion for tiles and other decorative materials.

Referring to FIG. 1, an improved polystyrene foam product is generally designated 10, and includes a polystyrene foam body 12, coated with a water-resistant coating 14. An adhesive 16 is applied over the coating 14 and decorative materials such as tiles 18 are then fastened to the product 10 using grout 20 or the like.

In one embodiment, the coating 14 is provided which renders a polystyrene foam product water-resistant and improves the product's adhesive properties. In addition to polystyrene, the coating 14 is preferably applied to a product made of any vinyl aromatic monomer having a foamed plastic construction.

In some embodiments, the present coating includes fly ash and a latex polymer. Unless otherwise noted, amounts or concentrations in this specification are on a weight basis.

Any fly ash can be used in the present coating, including Class F fly ash and Class C fly ash. Class C fly ash, which has a high lime (CaO) content and is obtained from the processing of certain coals, or its equivalent, is the most preferred. ASTM designation C-618 describes the characteristics of Class C fly ash (Boral Scherer Fly Ash, Juliette, Ga.). The amount of lime present in the fly ash material preferred in this invention is preferably greater than 10 wt %, more preferably greater than 15 wt %, and even more preferably greater than 20 wt %. Mixtures of different classes of fly ashes are also contemplated for use in the present coating, as are other cementitious materials, including Portland cement and lime.

The present coating includes from about 30% to about 90% by weight of fly ash. In some embodiments, the coating includes from 40% to 60% by weight of fly ash. In other embodiments, the coating has from 75% to 85% by weight of fly ash. In still other embodiments, the coating has from about 45% to about 55% by weight of fly ash. In yet other embodiments, the coating has at least 50% by weight of fly ash. Coatings with less than 30% by weight of fly ash are not recommended for polystyrene foam products because such coatings are more expensive to produce, take relatively longer to set, and do not have desired wear resistance properties.

Also included in the present coating is a water-soluble, film-forming polymer, preferably a latex polymer. The polymer can either be in a liquid form or added as a redispersible powder. Latex is a water-based stable dispersion (colloidal emulsion) of polymer micro-particles. Latexes may be natural or synthetic.

The latex is preferably made from a pure acrylic, a styrene rubber, a styrene butadiene rubber, a styrene acrylic, a vinyl acrylic, or an acrylated ethylene vinyl acetate copolymer. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, other acrylates, methacrylates and their blends, acrylic acid, methacrylic acid, styrene, vinyl toluene, vinyl acetate, vinyl esters of higher carboxylic acids than acetic acid, for example, vinyl versatate, acrylonitrile, acrylamide, butadiene, ethylene, vinyl chloride and the like, and mixtures thereof.

A particularly preferred latex polymer useful in some embodiment of this invention is a copolymer of methyl methacrylate and butyl acrylate (for example, Forton VF 774 Polymer from EPS Inc. Marengo, Ill.).

While it is contemplated that the polymer can be added in any useful amount, amounts from about 5% to about 40% by weight are preferred. In this application descriptions of percentages are by weight unless otherwise indicated. At least in some embodiments, the coating composition may include from about 10% to about 35% by weight of a polymer. The composition may include from about 15% to about 35% by weight of a polymer. The composition may include from about 20% to about 35% by weight of a polymer. The composition may include from about 5% to about 30% by weight of a polymer. The composition may include from about 10% to about 30% by weight of a polymer. The composition may include from about 15% to about 30% by weight of a polymer. The composition may include from about 20% to about 30% by weight of a polymer. The composition may include from about 5% to about 25% by weight of a polymer. The composition may include from about 10% to about 25% by weight of a polymer. The composition may include from about 10% to about 20% by weight of a polymer. The composition may include from about 15% to about 20% by weight of a polymer. The composition may include from about 5% to about 15% by weight of a polymer. The composition may include from about 10% to about 15% by weight of a polymer.

In some embodiments, the polymer is an emulsion or dispersion in water in a concentration from about 25% to about 75% by weight. In some embodiments, the polymer is an emulsion or dispersion in water in a concentration of about 50% by weight.

The total amount of water in the coating composition should be considered when preparing the composition. In some embodiments, if a latex polymer is supplied in liquid form, water used to disperse the polymer is counted toward the total amount of the composition water. In some embodiments, the total amount of water in the composition is from about 20% to about 50% by weight of fly ash. In some coating compositions, the total amount of water is from about 20% to about 30% by weight of fly ash. At least in some coating compositions, the total amount of water is about 25% by weight of fly ash. The total amount of water is calculated by accounting for all water added to the fly ash component and this includes the amount of water added with the polymer component, if the polymer component is supplied as an emulsion or dispersion in water. The total amount of water affects the polystyrene coating compositions of this invention. Compositions in which the total amount of water is higher than 50% are unsuitable.

In addition to the fly ash and the polymer components, other additives are contemplated, for example, such as conventional inorganic fillers and aggregates. Suitable fillers include, but are not limited to, sand, talc, mica, calcium carbonate, calcined clays, pumice, crushed or expanded perlite, volcanic ash, rice husk ash, diatomaceous earth, slag, metakaolin, and other pozzolanic materials.

Colorants are optionally added to change the color of the coating. Fly ash is typically gray in color, with the Class C fly ash usually lighter than Class F fly ash. Any dyes or pigments that are compatible with the composition are contemplated. Titanium dioxide is optionally used as a whitener. A preferred colorant is Ajack Black from Solution Dispersions, Cynthiana, Ky.

Set control additives are compounds that either accelerate or retard the setting time of a coating. One or more set controlling additives are optionally added to the present coating compositions. Organic compounds such as hydroxylated carboxylic acids and sugars are the preferred set control agents of some embodiments of the invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, trihydroxy benzoic acid, etc. are useful as set control agents in the coating compositions of some embodiments of the invention. Salts of organic acids such as sodium citrate, potassium citrate, sodium tartrate, potassium tartrate, sodium gluconate may also be used as set control agents in some embodiments of in the present invention. Inorganic acid based set control agents of the type boric acid and suitable salts thereof (borates) may also be employed in the coating compositions of some embodiments.

Other optional set control chemical additives useful in the present invention include sodium carbonate, potassium carbonate, calcium nitrate, calcium nitrite, calcium formate, calcium acetate, calcium chloride, lithium carbonate, lithium nitrate, lithium nitrite, aluminum sulfate, sodium aluminate, alkanolamines, polyphosphates, and the like.

In some embodiments, the present coating compositions include a superplasticizer which is selected from polycarboxylates, sulfonated melamines, sulfonated naphthalenes, and sulfonated lignins. Preferred superplasticizers include ADVA Cast by Grace Construction Products, Cambridge, Mass., DILOFLO GW Superplasticizer of Geo Specialty Chemicals, Cedartown, Ga. and various modified polycarboxylic ether superplasticizers such as for example, MEL-FLUX superplasticizers from BASF Construction Polymers GmbH, Germany.

Shrinkage reducing agents such as for example, glycols, decrease plastic shrinkage cracking as the coating dries and are optionally added to the present coating compositions.

In the context of the present invention, the term "total liquids" is defined as the total weight of latex polymer dispersion plus the weight of any extra added water in the composition. Similarly, the term "total solids" in the present invention is defined as the weight of fly ash plus the weight of any other material added to the composition in dry form.

The present coating compositions are formulated for application by a paint roller or airless paint sprayer. In some embodiments, a coating formulation is prepared by mixing in a blender fly ash, a latex polymer and a colorant in the total liquids/solids ratio of about 50 parts by weight of total liquids for every 100 parts by weight of total solids. Class C fly ash is preferably used with the advantage of faster drying and curing after application. Class F fly ash is also optionally included alone or in combination with Class C fly ash. Other alternative cementitious materials include Portland cement and lime. From about 1 to about 4 parts by weight of fly ash for one part by weight of a latex polymer dispersion is preferred in the compositions of this invention. All parts are calculated by weight.

At least in some embodiments, a water-resistant coating is prepared by mixing two parts by weight of Class C fly ash with one part by weight of an acrylic emulsion of 50% concentration in a blender until a uniform mixture is formed. A colorant is optionally added to the mixture in the amounts from about 0.10 to 0.50 parts of the total weight of fly ash.

A preformed polystyrene product is coated with any of the water-resistant coatings of this invention by using a paint roller. It has very surprisingly and unexpectedly been found that the coatings of this invention provide the desired water-resistance even when they are applied at very low application rates to the preformed polystyrene products. The application rate for the water-resistant coating is from about 10 g/ft$^2$ (108 g/m$^2$) to about 50 g/ft$^2$ (538 g/m$^2$). At these application rates, the thickness of the applied coating ranges from about 2.5 mils to about 12 mils. The application rate for the water-resistant coating is from about 20 g/ft$^2$ (215 g/m$^2$) to about 45 g/ft$^2$ (484 g/m$^2$). At these application rates, the thickness of the applied coating ranges from about 5 mils to about 11 mils. The application rate for the water-resistant coating is from about 25 g/ft$^2$ (269 g/m$^2$) to about 40 g/ft$^2$ (431 g/m$^2$). At these application rates, the thickness of the applied coating ranges from about 6 mils to about 10 mils. At least in some embodiments, the application rate is approximately 30-37 g/ft$^2$ (323 g/m$^2$-398 g/m$^2$). At these application rates, the thickness of the applied coating ranges from about 7 mils to about 9 mils.

Figure 2:
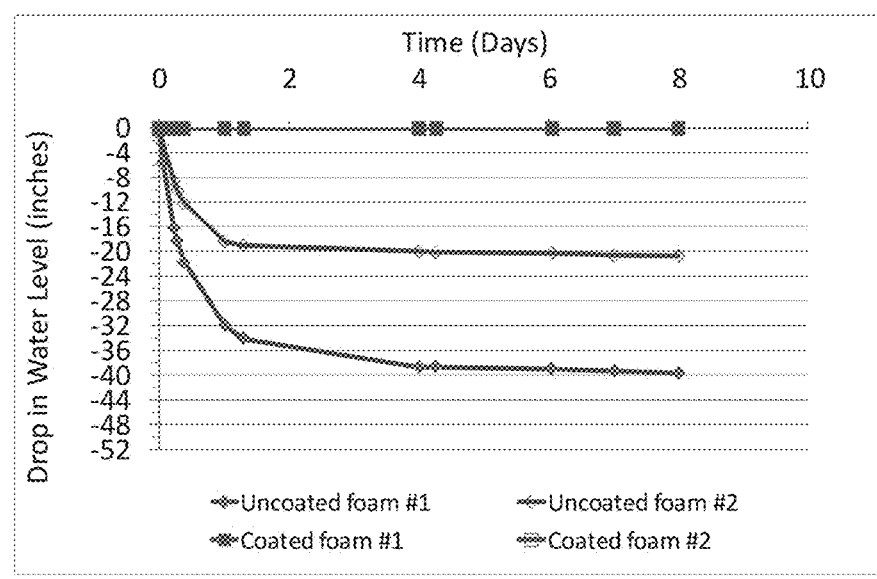
FIG. 2 is a graphical representation of a water column test for a polystyrene foam product coated with a water-resistant composition.

Different methods are used to measure whether coated polystyrene foam products are resistant to water penetration. In some embodiments, a water-penetration test is conducted in which a polystyrene foam board is coated with one of the water-resistant coatings and allowed to dry. A measuring plastic tube (such as for example, a plastic measuring cylinder) is then attached to the board with a gasket sealant. The plastic tube is then filled with water to form a water column above the board, and the level of water in the plastic tube is then monitored and recorded over time. As shown in FIG. 2, water easily penetrates a control polystyrene foam board not covered with a water-resistant coating (FIG. 2, graphs for uncoated foams 1 and 2). However, a polystyrene board covered with the present water-resistant coating remains water-resistant for a long period of time. (FIG. 2, graphs for coated foams 1 and 2). Based on this analysis, a coated polystyrene foam board that shows no or relatively very small drop in water level by day 5 is deemed to be water-resistant.

It was unexpectedly determined that the present coating composition, even when applied at very low application rates, renders a polystyrene foam product water-resistant which is ordinarily not water-resistant. It was also unexpectedly discovered that the coated polystyrene foam product possesses improved properties over conventional polystyrene products in part because the coated polystyrene product is water-resistant.

It was also unexpectedly discovered that the present water-resistant coatings improve the adhesive strength of a polystyrene foam product to ceramic tiles and other decorative materials.

Figure 3:
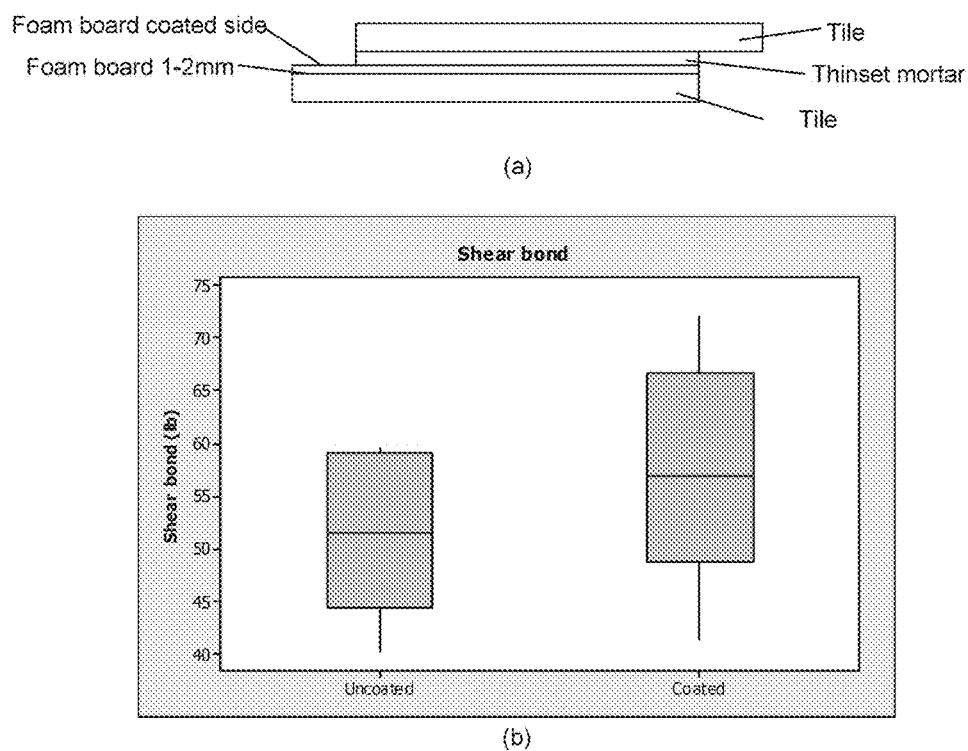
FIG. 3 is a shear bond test setup (a) and its results (b)

Different tests were conducted to evaluate adhesive properties of the present polystyrene foam product. At least in some embodiments, a shear bond test was conducted in accordance with ANSI A118.10 test standard. In this test, a polystyrene foam board is coated with the present coating composition. A tile is then attached to the coated board and to an uncoated control board as shown in FIG. 3(a). The boards are then cut and sanded down to 1-2 mm. The sanded boards are glued to another piece of tile as shown in FIG. 3(a). This sample preparation ensures that a true bond value is measured and the failure inside a foam board is avoided and discounted.

A shear bond test is then conducted and results are plotted as shown in FIG. 3(b). As can be seen from FIG. 3(b), the present coating improves the adhesive strength of a polystyrene foam product to a tile by more than 10%. This result is unexpected because ceramic tiles and other decorative materials do not adhere well to conventional polystyrene foam products and dislodge easily.

At least in some embodiments, the adhesion is improved by as much as at least 20%, as measured in a shear bond test. At least in some embodiments, the present water-resistant coatings improve the adhesive strength of a polystyrene foam product to ceramic tiles and other decorative materials by at least 30%, as measured in a shear bond test. At least in some embodiments, the water-resistant coatings of this invention improve the adhesive strength of a polystyrene foam product to ceramic tiles and other decorative materials by at least 40%, as measured in a shear bond test.

To obtain even distribution of a coating, especially when painting irregular shapes, the present coating formulation is sprayed with an airless paint sprayer. In some embodiments, the sprayable coating formulations include Class C fly ash, a latex polymer and a superplasticizer. It was also unexpectedly discovered that the proper ratios between the fly ash, latex polymer and superplasticizer components is a key to obtaining a sprayable coating formulation. In some embodiments, between 1.00 and 0.60 parts by weight of a polycarboxylic ether superplasticizer is used for about 100 parts by weight of Class C fly ash, and about 50 parts by weight of a 50% latex polymer emulsion in water. Formulations in which a polycarboxylic ether superplasticizer is used in the amounts higher than 1.0 parts by weight, are not recommended, as these formulations result in a coating which is too fluid and runs down rapidly when used over the vertical or sloped surfaces. At least in some embodiments, between 0.25 and 0.50 parts by weight of a superplasticizer is used for about 100 parts by weight of a Class C fly ash, and about 50 parts by weight of a 50% latex polymer emulsion. At least in some embodiments, a superplasticizer is used in combination with a set control agent.

Some coating compositions are not suitable for being sprayed as these compositions may clog up a spray nozzle. For example, compositions with Class C fly ash and a latex polymer without a superplasticizer may be too viscous to be sprayed. Some other coating compositions can be sprayed only for a very limited period of time as they start to thicken in about 15 minutes and clog up a spray nozzle after that. Clogging of equipment needs to be avoided during production. Suitable sprayable formulations include those that can be sprayed for at least 40 minutes and preferably for at least an hour.

There are at least two reasons for the clogging of the spray nozzle: i) presence of coarse lumps in the fly ash (of up to 2 mm in size) that do not necessarily dissolve upon mixing with water; and ii) the relatively faster setting behavior of the coating material. The inventors have unexpectedly determined that a sprayable coating can be significantly improved if coarse lumps are sieved and removed from the fly ash. In some embodiments, coarse lumps in fly ash can be screened by using a mesh. Meshes of different sizes can be employed to remove most coarse lumps that may not dissolve fully upon mixing and thereby may clog up the equipment. In some embodiments, meshes with an opening from about 0.2 to about 0.7 mm can be used to improve a sprayable coating. At least in some embodiments, a 0.595 mm mesh, such as No. 30 mesh is suitable.

In some embodiments, a set control agent is added to delay the set time of a sprayable water-resistant coating for polystyrene foam products. At least in some of the embodiments, sodium citrate is used as set control agent. At least in some embodiments, any suitable salt of citric acid is used. In some embodiments, a set control agent is used in the amounts from about 0.10 to about 0.20 parts by weight for about 100 parts by weight of fly ash. At least in some embodiments, the amount of a set control agent is increased up to 0.75 parts by weight of fly ash. At least in some other embodiments, the amount of a set control agent is increased up to 0.50 parts by weight of fly ash. In some embodiments, a further delay in the set time is achieved by increasing the amount of a set control agent further. At least in some embodiments, the amount of a set control agent is decreased to 0.10 parts by weight of fly ash. While in some other embodiments there is no set control agent present.

At least in some sprayable formulations, a set control agent can be used in combination with a superplasticizer. Such superplasticizers may include, but are not limited to, a polycarboxylic ether superplasticizer. In these sprayable formulations, between 0.10 and 0.30 parts by weight of a set control agent, such as for example sodium citrate, is used in combination with about 0.10 to about 0.30 parts by weight of a superplasticizer for each 100 parts by weight of Class C fly ash and about 40 to 60 parts by weight of a latex polymer emulsion of about 50% concentration. At least in some sprayable formulations, between 0.15 and 0.25 parts by weight of a set control agent, such as for example sodium citrate, is used in combination with about 0.15 to about 0.25 parts by weight of a superplasticizer for each 100 parts by weight of Class C fly ash and about 40 to 60 parts by weight of a latex polymer emulsion of about 50% concentration.

The inventors have unexpectedly determined that at least some sprayable formulations for polystyrene foam products do not include a polycarboxylic ether superplasticizer. Such sprayable formulations include between about 0.10 to about 0.30 parts by weight of a set control agent, such as for example polycarboxylic acid, citric acid, or any suitable salt thereof, for each 100 parts by weight of Class C fly ash and about 50 parts by weight of a latex polymer in liquid form with a 50% concentration. At least in some embodiments, such sprayable formulations include about 0.20 parts by weight of a set control agent, such as for example polycarboxylic acid, citric acid, or any suitable salt thereof, for each 100 parts by weight of Class C fly ash and about 50 parts by weight of a latex polymer in liquid form with about 50% concentration. Additional water is optionally added to these formulations. The total liquids in such cases are defined as the total weight of the polymer latex dispersion plus the total weight of added water. In general, the total liquids to solids weight ratio in these formulations is from about 0.40 to about 0.70, where the weight of total solids comprises the weight of fly ash plus the weight of other additives added in dry form. At least in some embodiments, the total liquids to solids weight ratio is about 0.60. At least in some embodiments, the total liquids to solids weight ratio is about 0.55. At least in some other embodiments, the total liquids to solids weight ratio is about 0.40.

The present sprayable water-resistant coating formulation is very light in weight. It has very surprisingly and unexpectedly been found that the sprayable coatings of this invention provide the desired water-resistance to the preformed polystyrene foam products even when they are applied at very low application rates. At least in some embodiments, the coating weight of a sprayable water-resistant formulation is between 10 g/ft$^2$ (108 g/m$^2$) and 50 g/ft$^2$ (538 g/m$^2$). At least in some embodiments, the coating weight of a sprayable water-resistant formulation is between 25 and 45 g/ft$^2$ (269 and 484 g/m$^2$). At least in some embodiments, the coating weight is between 30 and 40 g/ft$^2$ (323 and 431 g/m$^2$). At least in some embodiments, the coating weight is between 30 and 37 g/ft$^2$ (323 and 398 g/m$^2$).

One of the important characteristics of sprayable water-resistant formulations is the material viscosity. Various methods known to a person of skill can be performed to determine the material viscosity. At least in some embodiments, a Sheen Cup test can be conducted to determine viscosity of the present sprayable formulation. A Sheen Cup is similar to a Ford Cup, but with a bigger opening to allow for testing of more viscous materials. See FIG. 6. Different models for a Sheen Cup can be used. One model that can be used is 401/6, BS 3900, A6-1971, with an opening of 7.14 mm.

To determine viscosity of a water-resistant sprayable formulation, a Sheen Cup is filled with a formulation sample, and the time required to completely drain the sample from the cup is characterized as a measurement of material viscosity. Material viscosity usually increases with stiffening and setting of the slurry, therefore, it can be used to monitor stiffening and setting behavior of materials. Sprayable water-resistant formulations may have a viscosity from about 10 to about 50 seconds as measured by a Sheen Cup test. At least in some embodiments, the viscosity of the material remains between 10 and 30 seconds during the first hour after the initial mixing. FIG. 4 provides viscosity data by a Sheen Cup test for various sprayable water-resistant formulations. The most preferred formulations of the present coating are those in which the viscosity of the material remains in the range of about 10 seconds for the first 40 minutes after the initial mixing as measured by a Sheen Cup test (see Mix 3 in FIG. 4).

Temperature of a water-resistant coating increases as it sets. Temperature measurements for various sprayable formulations over a period of time were obtained and plotted as shown in FIG. 5. At least in some embodiments, the temperature for preferred sprayable water-resistant formulations very unexpectedly has been found to remain constant at about 27° C. for at least 40 minutes after the initial mixing (see Mix 3 in FIG. 5).

In some embodiments, the viscosity of the coating material after mixing remains generally constant for about 30 minutes or more (e.g., about 40 minutes or more, about 50 minutes or more, about 60 minutes or more), such as about 30 minutes to about 60 minutes. In these embodiments, the coating material remains easily workable and sprayable during the period the material viscosity is practically unchanged.

In some embodiments, the temperature of the coating material after mixing remains generally constant for about 30 minutes or more (e.g., about 40 minutes or more, about 50 minutes or more, about 60 minutes or more), such as about 30 minutes to about 60 minutes. In these embodiments, the coating material remains easily workable and sprayable during the period the material temperature is practically unchanged.

In some embodiments, the coating sets and dries rapidly when applied as a thin layer to the polystyrene foam component. The amount of Class C fly ash present in the coating is desirable in this regard. This advantage can be achieved in accordance with embodiments of the invention both under ambient conditions and at elevated temperatures. For example, in some embodiments, the coating setting and drying time, under ambient condition of 75° F. temperature and 50% relative humidity, can be about 40 minutes or less (e.g., about 30 minutes or less, about 20 minutes or less, about 10 minutes or less), such as about 10 minutes to about 40 minutes. In some embodiments, the coating sets very rapidly at elevated temperatures. For example, in some embodiments, the final setting and drying time of the coating at elevated temperatures (about 175° F. to about 225° F.) can be about 3 minutes or less (e.g., about 2 minutes or less, about 1 minute or less, or about 30 seconds or less), such as about 30 seconds to about 3 minutes.

The water-resistant coatings of some embodiments of this invention can also be used to embed and bond reinforcing meshes and scrims to the surface of the foam products. Examples of suitable reinforcing meshes include fiberglass meshes, metal strand meshes, plastic fiber (polymer) meshes, carbon fiber meshes, natural fiber meshes, and meshes made using hybrid reinforcing materials. Such meshes when bonded to the surface of the foam products help to enhance the flexural strength and other mechanical properties of the overall composite.

In the examples presented below, Class C fly ash, supplied by Boral Material Technologies, from Scherer Plant, Juliette, Ga. was used to prepare the water-resistant coating formulations of this invention.

EXAMPLE 1

Water-Resistant Coating Composition for Preformed Polystyrene Foam Products

A coating was prepared according to the formulation in Table 1, where all parts were calculated by weight. Class C fly ash was used in this example with the advantage of faster drying and curing. Class F fly ash can also be used. Other cementitious materials can also be used, including Portland cement and lime. Forton VF 774 is an acrylic emulsion of about 50% concentration (polymer solids by weight) made by EPS Inc., Marengo, Ill. The dry powder and liquid were mixed in a blender until a uniform mixture was formed.

TABLE 1

| Coating Formulation for Paint Roller | |
|---|---|
|  | Parts (by weight) |
| Class C fly ash | 100 |
| Forton VF774 (latex polymer) | 50 |
| Black colorant | 0.20 |
| Total liquids/solids ratio | 0.50 |

EXAMPLE 2

Testing Water Resistance of Expanded Polystyrene Foam Products Coated with the Water-Resistant Coating of Example 1

The coating from Example 1 was applied to a polystyrene foam board by a ⅜" nap paint roller to achieve good coverage. The application rate was approximately 30 g/ft² (323 g/m²). The average thickness of the applied coating at this application rate was about 7 mils.

The coated board and an uncoated control board were subjected to a water column test to determine the level of water penetration.

In this test, the boards were exposed to a 48" water column and the ability to resist water penetration into the board was measured by the water level drop in the column. A plastic tube was attached to the test specimen with PERMATEX® gasket sealant, and water was filled to form a 48" water column above the board. The test results are shown in FIG. 2. The level of water dropped immediately in the column over a control uncoated polystyrene board, indicative that water penetrated the uncoated polystyrene, which was not resistant to water.

Unlike the uncoated control, the water level did not change even by day 8 in two columns with polystyrene board samples coated with the water-resistant coating of Example 1. Thus, the coating of Example 1 renders a polystyrene foam board water-resistant. Furthermore, a paint roller can be used to apply the water-resistant coating to a polystyrene foam board.

EXAMPLE 3

Testing Adhesive Strength of Expanded Polystyrene Foam Products Coated with the Water-Resistant Coating of Example 1

A polystyrene foam board was coated with the coating of Example 1 and was allowed to dry. A shear bond test was then performed per ANSI A118.10 test standard and as described below. The coated polystyrene board and an uncoated control polystyrene board were each attached to a tile with LATICRETE® 253R latex-modified thinset mortar. See FIG. 3(a). Each board was then cut and sanded down to 1-2 mm. The sanded boards were then glued to another piece of tile by epoxy as shown in FIG. 3(a). The shear bond strength was then measured for each of the samples and plotted. As shown in FIG. 3(b), the shear bond strength of a coated sample was greater than that of an uncoated control sample. Thus, the water-resistant coating also improves the adhesive properties of a polystyrene foam product.

EXAMPLE 4

Sprayable Water-Resistant Coating for a Preformed Polystyrene Product

Three different formulations were prepared with ingredients as shown in Table 2. Mix 1 is the same coating formulation as in Example 1. The amount of a latex polymer was increased in Mix 2, so that the weight ratio between Class C fly ash and a latex polymer dispersion became 1:0.55. A superplasticizer (Melflux 267L) was added in the amount of 1.0 part by weight of fly ash. See Table 2. For Mix 3, the weight ratio between Class C fly ash and a latex polymer dispersion was changed to 1:0.50; and the amount of the superplasticizer was decreased to 0.60 parts by weight of fly ash. See Table 2.

Each of these three mixtures was then sprayed on a preformed polystyrene foam product with a sprayer. Various sizes of a spraying nozzle were used in the assessment. The nomination for the nozzles is usually a three digit number. The first number means the fan width. For example, nozzle 5xx has a fan width of 5 inches, and spray coverage 10 inch wide. The last two numbers represent the tip hole size. For example, the 555 nozzle has a tip opening of 0.055 inch diameter, or 1397 microns. In this example, the fan width was kept at 5 inches, with varying sizes of tip openings.

As can be seen from Table 2, Mix 1 was sprayed with nozzle 519 and it was found that the slurry was too thick to be sprayed and it clogged up the nozzle. To make the slurry more fluid and easier to spray, more polymer was added in the mixture for Mix 2 with the total liquids/solids ratio of 0.55, and 1.0 part by weight of a superplasticizer was also added. A bigger nozzle of 0.031" opening was also used to avoid clogging. This formulation was too fluid and the coating ran down from vertical surfaces. In Mix 3, the total liquids/solids ratio was back to the original 0.50 as provided in Example 1, and less superplasticizer was used (0.60 parts by weight). Mix 3 sprayed well, but the slurry started thickening at 15 minutes and could not be sprayed after that.

TABLE 2

Sprayable Coating Formulation

| | Parts (by weight) | | |
|---|---|---|---|
| | Mix 1 | Mix 2 | Mix 3 |
| Class C fly ash | 100 | 100 | 100 |
| Forton VF774 (latex polymer) | 50 | 55 | 50 |
| Melflux 267L (superplasticizer) | — | 1.0 | 0.60 |
| Black colorant | 0.20 | 0.20 | 0.20 |
| Total liquids/solids ratio | 0.50 | 0.55 | 0.50 |
| Nozzle size | 519 | 531 | 555 |
| Notes | Too thick, clog up nozzle and cannot be sprayed | Coating running down | Starts to thicken at 15 minutes |

EXAMPLE 5

Sprayable Water-Resistant Coating for a Polystyrene Foam Product

In this example, coarse lumps in fly ash were screened by using No. 30 mesh which has an opening of 0.0234" (0.595 mm) to remove coarse lumps that may clog up the equipment. Attempt was also made to delay the set time of the slurry by adding sodium citrate.

The rheological and setting behavior of the coating compositions was monitored by viscosity measurements using a Sheen Cup, model 401/6, BS 3900, A6-1971, with an opening of 7.14 mm. The Sheen Cup was filled with slurry and the time to completely drain the slurry was used as a measurement of viscosity.

Two different mixes were prepared as shown in Table 3 below. Mix 1 has a total liquids/solids ratio of 1:2, respectively, and 0.50 parts by weight of a superplasticizer. An attempt was made to spray the mix with nozzle 555 so that the coating did not clog up a nozzle, but the coating was too fluid. A smaller tip, 535, was then used. The coating was still setting fast, and could not be sprayed at 6 minutes even though the initial Sheen Cup reading was only 18 seconds. See Table 3 for formulation details.

In Mix 2, the superplasticizer was reduced down to 0.25 parts by weight, and 0.20 parts by weight of sodium citrate was added. A good smooth finish was achieved with this mix. The initial Sheen Cup reading was 48 seconds, and increased to 1 minute 24 seconds after 7.5 minutes.

TABLE 3

Coating Formulations for Sprayer

| | Parts (by Weight) | |
|---|---|---|
| | Mix 1 | Mix 2 |
| Class C fly ash (−30 mesh) | 100 | 100 |
| Forton VF774 (latex polymer) | 50 | 55 |
| Melflux 267L | 0.50 | 0.25 |
| Sodium citrate | — | 0.20 |
| Black colorant | 0.20 | 0.20 |
| Total liquids/solids ratio | 0.50 | 0.50 |
| Nozzle size | 555; 535 | 555; 535 |
| Initial Sheen Cup reading (s) | 18 | 48 |
| Notes | Too fluid | Uniform appearance |

EXAMPLE 6

Figure 4:
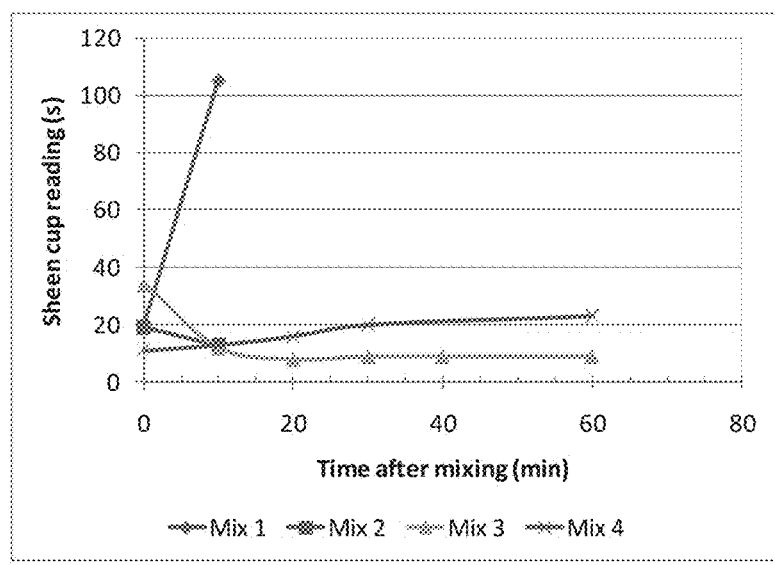
FIG. 4 is a viscosity analysis by a Sheen Cup test for coatings of Table 4.

Improved Sprayable Water-Resistant Coating with a Delayed Setting Time for a Polystyrene Foam Product In this example, various mixes with extra water and/or citric acid were prepared as shown in Table 4. Viscosity of the material was monitored over a period of time by a Sheen Cup analysis and plotted as shown in FIG. 4. Temperature for each mix was measured simultaneously and plotted as shown in FIG. 5.

Mix 1 is similar to Mix 1 in Examples 1 and 2, except 2.5 parts extra water (total liquids/solids ratio 0.525) was added to delay the set time. As can be seen from FIG. 4, the viscosity of Mix 1 increased rapidly, and extra water did not slow down the set time. Specifically, the Sheen Cup reading for Mix 1 increased from 20 seconds to over 100 seconds in 10 minutes. Further, no Sheen Cup reading could be obtained at 20 minutes or after that because the mix became very stiff.

Figure 5:
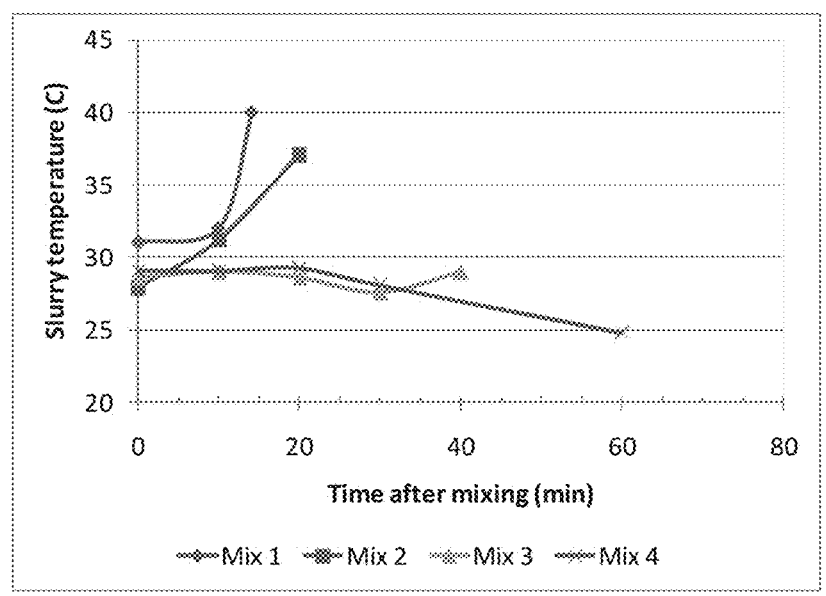
FIG. 5 is a graphical representation of temperature development for coatings of Table 4.
Figure 6:
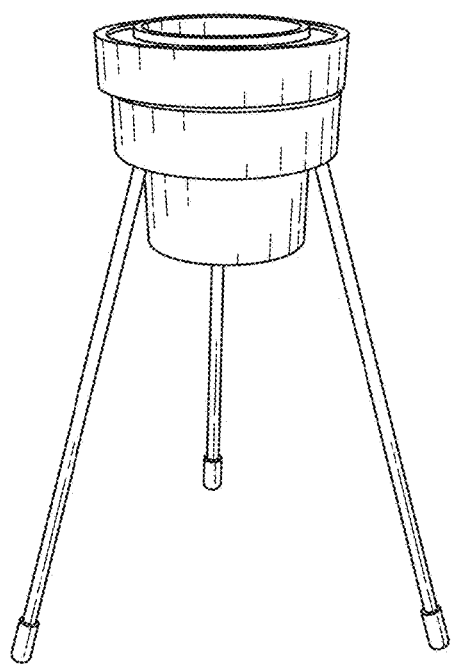
FIG. 6 is a front representative view of a Sheen Cup of the type used to generate data of FIG. 4.

Turning to temperature measurements as shown in FIG. 5, temperature for Mix 1 increased almost 10° C. in 20 minutes.

As shown in Table 4, Mix 2 had 10 parts extra water in comparison to the initial mixture of Example 1, making the total liquids/solids ratio of 0.60. There were a lot of bubbles after mixing, probably due to the extra water added. The bubbles decreased over time, and led to a lower Sheen Cup reading at 10 minutes. See FIG. 4, Mix 2. At 20 minutes, slurry jelled up and could not be poured into a Sheen Cup for reading.

As can be seen in FIG. 5, temperature for Mix 2 increased from 27° C. to 37° C. in 20 minutes. These results for Mixes 1 & 2 indicate that adding water alone cannot slow down the set time efficiently.

In Mix 3, 5 parts extra water and 0.20 parts citric acid were added to delay the set time (total liquids/solids ratio 0.55). This mix had fewer bubbles than Mix 2. Surprisingly, the Sheen Cup readings were consistently at about 10 seconds during a period of time from about 10 minutes from the beginning of the test and up to about one hour into the test. See FIG. 4. This suggests that the coating material is practically chemically dormant during the first hour. This observation is also confirmed by the slurry temperature measurements as shown in FIG. 5, which stayed at about 27° C. for the first hour.

In Mix 4, only 0.20 parts of citric acid was added. No extra water was added to this mixture. See Table 4. As can be seen from FIG. 4, there was an increase in the Sheen Cup readings from 11 to 23 seconds in an hour, but the slurry temperature decreased from 29° C. to 25° C. Based on the observation, it can be concluded that a combination of extra water and citric acid is needed to delay the set time to over one hour.

Each of the four mixtures was used to spray-coat a polystyrene foam product. The coating weight was between 30-37 g/ft$^2$ (323-398 g/m$^2$). The average thickness of the applied coating at these application rates ranged from about 7 to 9 mils. A water column test was also conducted as described in Example 2 for polystyrene foam products coated with the mixes of this Example, and no water level drop was detected for a period of 10 days.

TABLE 4

Sprayable Water-Resistant Coating Formulations

| | Parts (by weight) | | | |
|---|---|---|---|---|
| | Mix 1 | Mix 2 | Mix 3 | Mix 4 |
| Class C fly ash (−30 mesh) | 100 | 100 | 100 | 100 |
| Forton VF774 (latex polymer) | 50 | 50 | 50 | 50 |
| Citric acid | — | — | 0.20 | 0.20 |
| Water | 2.5 | 10 | 5 | — |
| Total liquids/ solids ratio | 0.525 | 0.60 | 0.55 | 0.50 |
| Black colorant | 0.20 | 0.20 | 0.20 | 0.20 |
| Notes | — | A lot of bubbles at the beginning, but bubbles disappeared over time | Less bubbles than Mix 2, creamy mixture | Less bubbles than Mix 2 |

While particular embodiments have been shown and described, it will be appreciated by those skilled in the art that changes and modifications may be made thereto without departing from the invention in its broader aspects and as set forth in the following claims.

What is claimed is:

1. A preformed shower or bathroom component consisting of:
    an expanded polystyrene foam body covered with a single-layer coating,
    wherein the single-layer coating consists of from about 60% to about 90% by weight Class C fly ash, a set control agent and a latex polymer, and optionally, a polycarboxylic ether superplasticizer and colorant,
    wherein about 0.20 to about 0.75 parts by weight of said set control agent is used for every 100 parts by weight of said Class C fly ash;
    wherein said single-layer coating is applied in an amount from 10 grams to 50 grams per one square foot of the expanded polystyrene foam body;
    wherein said single-layer coating renders said component water-resistant;
    wherein said single-layer coating improves adhesion of said component to ceramic tiles; and
    wherein the adhesion to ceramic tiles of said component is improved by at least 10% in comparison to a preformed polystyrene foam component not covered with said single-layer coating.

2. The component of claim 1, wherein the single-layer coating weighs from about 20 g/ft$^2$ to about 45 g/ft$^2$ (from about 215 g/m$^2$ to 484 g/m$^2$) of said expanded polystyrene foam body surface.

3. The component of claim 1, wherein said set control agent is selected from the group consisting of polycarboxylic acid, citric acid, and any suitable salt thereof.

4. The component of claim 1, wherein said component remains water-resistant when exposed to a 48" head of water continuously for at least 10 days.

5. The preformed shower or bathroom component of claim 1, wherein about 0.2 to about 0.30 parts by weight of said set control agent is used for every 100 parts by weight of said Class C fly ash in the coating.

6. The preformed shower or bathroom component of claim 1, wherein the superplasticizer is used in an amount from about 0.10 to about 0.50 parts by weight for 100 parts by weight of said Class C fly ash.

7. The preformed shower or bathroom component of claim 1, wherein said latex polymer is a copolymer of methyl methacrylate and butyl acrylate.

8. A method of making the preformed shower or bathroom component of claim 1, the method comprising:
    spraying the single-layer coating over the expanded polystyrene foam body,
    wherein the single-layer coating consists of from about 60% to about 90% by weight Class C fly ash, a set control agent and a latex polymer, and optionally, a polycarboxylic ether superplasticizer and colorant,
    wherein about 0.20 to about 0.75 parts by weight of said set control agent is used for every 100 parts by weight of said Class C fly ash;
    wherein said single-layer coating is applied in an amount from 10 grams to 50 grams per one square foot of the expanded polystyrene foam body.

9. The method of claim 8, wherein the single-layer coating is allowed to dry for 10 to 40 minutes at 75° F. temperature and 50% relative humidity.

10. The method of claim 8, wherein the single-layer coating is allowed to dry for 30 seconds to 3 minutes at a temperature in the range from 175° F. to 225° F.

* * * * *